Patented Nov. 4, 1941

2,261,166

UNITED STATES PATENT OFFICE 2,261,166

METHOD OF MAKING RUBBER MIXTURES AND RESULTING PRODUCT

Michael Levin, Baltimore, Md., assignor of eight-twentieths to Jacob T. Basseches, New York, N. Y.

No Drawing. Application July 5, 1933, Serial No. 679,097

18 Claims. (Cl. 260—717)

This invention relates to the production of rubber products and to a process of reclaiming rubber.

It is an object of my invention to provide a process for forming rubber products and for reclaiming rubber from materials containing rubber in low percentages thereof.

It is further contemplated by my invention to provide a process in which rubber and fibrous material accompanying the same may be formed into highly desirable products in a highly expeditious manner, and with low cost of production.

Rubber reclaiming processes, as known to me, in which old rubber scrap, comprising automobile tires containing a large percentage of cotton threads or cords, have as their primary aim, the recovery of rubber and the separation of the fibrous material therefrom. This involves, in general, more or less complete destruction or degeneration of the fibrous material where the latter occurs in relatively high percentages. Processes which involve the destruction or degeneration of the fibre more frequently employ an alkali of caustic concentrations which, in order to separate from the fibrous material, when it is desired to also reclaim this material, necessitates tedious and laborious methods for washing the fibrous material free of the alkali used. Where degenerated cotton or cotton threads result from the use of caustic alkali solutions or alkali solutions of such concentrations as cause the degeneration of the fibrous material, where no attempt is made to separate the rubber from the cellulose, the tensile strength of the fibers of the cellulosic material is lost, and the cellulosic material merely is present as so much inert filler, and careful washing or removal of the excess alkali must be effected, in addition to the labor and time necessary for effecting the degeneration of the fibre, the objection to the presence of large quantities of alkali being readily recognized.

In accordance with my process, scrap rubber, such as automobile tires, is utilized, and separation of the rubber from the carcass is accomplished by purely mechanical means, that is, by separating the tread and side walls, leaving the plies of fabric of cotton cord with very small percentages of rubber. The carcass thus provided forms the essential material of my process. After preparing the carcass in accordance with the procedure above outlined, the carcass is granulated or shredded by suitable mechanical means, such as by grinding. The ground scrap in this condition is then treated to plasticize the rubber and uniformly distribute the fiber through said rubber, while retaining the fibers in isolated fibril condition of substantial strength.

An essential feature of my process involves the plasticization of the rubber and fibers in the presence of dilute solutions of alkali. The percentage of alkali may be characterized in accordance with my understanding of the action which occurs, as having such action upon the fibers as facilitates separation, without materially altering the fibrous characteristics of the cellulose. In the plasticizing of the scrap in accordance with my process, ground rubber and fiber carcass are admixed with a plasticizing oil, such as rosin oil, with a solvent therefor, such as cymene, also wood turpentine with caustic soda and water. After uniformly distributing these materials, plasticization is effected by heating under pressure in the presence of dry steam.

The preferred formula, in accordance with my invention, is as follows:

| | Pounds |
|---|---|
| Carcass scrap ground to about 1/8" | 60 |
| Rosin oil | 2 |
| Solvinol (cymene)—(para-methyl-iso-propyl-benzene or ortho-meta mixtures) | 1 |
| Blood albumen (black blood albumen, blood serum or whole blood) | 1/2 |
| Caustic soda, equivalent to about .4% of the total mass | 1/4 |
| Water, equivalent to about 1.6% of the total mass | 1 |

In the above formula, the caustic soda is added as a dilute solution to the carcass scrap which has first been mixed with a rosin oil solution in cymene. Having intimately mixed the ground carcass scrap and rosin oil solution in cymene there is then added the specified quantity of blood albumen, though the inclusion of this ingredient is optional and it may be omitted. Thereupon the scrap is covered with the caustic alkali solution, preferably as a solution of one quarter pound of alkali in one pound of water. After intimately mixing these constituents in an internal mixer, they are then removed to pans or screens where they may be permitted to remain for several days, though the pans or screens may be directly removed to an autoclave and submitted to dry steam at pressures of 175 to 200 pounds at a temperature of about 360 degrees F. The autoclave is preferably steam-jacketed and the product is treated for a period of about one to four hours.

In the above procedure, the caustic alkali may constitute from .3 to 1.5% alkali of the rubber-fiber scrap, though .4% alkali is preferred by me.

The preferred percentage of alkali will add good ageing characteristics, in addition to aiding in the dispersion, acceleration of vulcanization, tensile strength and elongation of the final product. Within the range stated desirable results will be obtained, though the higher limits of the range of percentages of alkali specified may be used where ageing characteristics are not too important and where such lower ageing characteristics are compensated by the addition of other materials which may impart ageing characteristics. Of course, the labor of this additional step makes it desirable to keep the percentages of alkali within the lower limits.

Though caustic alkali has been specified by me as the preferred ingredient, and one of its functions is to saponify the abietic acid in the rosin oil, helping to disperse the cellulose with the rubber during the subsequent milling, and aid in the vulcanization, to a certain extent other saponifying materials may be substituted with a fair degree of success and such materials as hydrated lime, magnesium hydrate and the alkaline earth metal hydroxides may be used to form abietates. To a certain extent, also zincates, ammonium hydroxide, sodium carbonate, ammonium carbonate, ammonium phosphate may be used.

Though I have specified rosin oil or a material including an abietate as preferred by me, some degree of success may be obtained by using saturated fatty acids, such as formic, lauric, caproic, palmitic or stearic acids and also unsaturated fatty acids, as oleic and linoleic acids, and similar unsaturated fatty acids with one or more double bonds. Essentially, the rosin oil containing the abietate and, to a certain degree, the other fatty acids mentioned, serve as plasticizing agents for the rubber.

The quantity of rosin oil determines, to a certain extent, the softness of the final product. By increasing the rosin content based upon the rubber present, that is 30 pounds of rubber to 2 pounds of rosin oil, which is equivalent to about 6% of rosin oil on the rubber content, a very desirable product is obtained. As the rosin oil content is increased, the final rubber product becomes softer.

The cymene and Solvinol, or wood turpentine act as a carrier for the rosin oil, as well as a softener and penetrant for the rubber at the temperatures used for plasticizing and these materials, particularly in the presence of the alkali, have such effect upon the rubber to permit the milling in the presence of the cellulose of the carcass, to require no separation of the alkali. So far as the percentage of alkali is concerned, it may be characterized as being present up to the point where it more or less completely enters into saponifying reaction with the saponifiable materials.

After treatment in accordance with the procedure above outlined, the mass is then directly submitted to a refining action which comprises passing the material repeatedly through pressure rolls or a Bamberry mixer. This repeated action attenuates the individual fibers and uniformly distributes the same through the plasticized rubber. After repeated refining, preferably under heat by heating the rolls until the individual fibers have been isolated and fully encased in the rubber component thereof, the water evaporated and the alkali saponified, other ingredients may be added.

For the production of rubber soles or rubber heels, to the mass prepared, there is added the following:

| | Per cent |
|---|---|
| Sulphur | 3 |
| Accelerator | ½ to 2 |
| Anti-oxidant | 2 |
| Wax (montan) | 20 |
| Clay | 20 |
| Zinc oxide | 4 |

The percentages above outlined are based upon the rubber content. Prior to the addition of the percentages of material above specified, in the production of material suitable for rubber soles and heels, there is added equal parts of crude rubber to the weight of the refined scrap.

In the production of a material suitable for flooring, the refined scrap coming from the autoclave is mixed in the proportions of 90% of the refined scrap to 10% of crude rubber.

In the production of rubber soles or heels for shoes, in accordance with the formula given as preferred for making rubber soles and heels, a great quantity of material is preliminarily shaped and pressed into a mold, defining the contour of the soles or heels and is then cured from three and one half to fifteen minutes at from 40 to 70 pounds pressure. The product flows well into the mold to take on the contour of the mold. The product has a stiffness characteristic of leather used for soles, but will not crack. The pigmenting material, such as carbon black, normally used with rubber, is so uniformly distributed when formed into either the soles or heels or flooring, as to exhibit no marking effect upon light colored floors. The isolated condition of the fibrils of cellulose acts effectively to prevent slipping while making the product resistant to any softening action by oils. In the repeated use for soles or heels, no distortion or spreading of the fabric is evident, and in this characteristic the product simulates leather.

The degree of isolation of the cellulosic fibrils will depend upon the number of passes of the composition after treatment in the autoclave. For the softer rubbers, where making such materials as artificial leather, the raw ingredients are sent through the mill for twelve passes, more or less, until the product comes from the mill rolls almost as transparent sheets, which are of the thickness of the walls of very thin toy balloons.

Where making such materials as soles, rubber heels or floor covering, in which it is found desirable to keep the fibres in as large a state as possible, two or three passes through the milling rolls will be found sufficient. For making oil and gasoline resisting fabrics, in which a high cellulose content is desired more or less microscopically distributed through the rubber matrix, yet obtaining some degree of stiffness of the product, separate batches may be prepared, one of which is intimately refined by sending through the mill for ten to twelve passes and the other batch, which has been sent through the mill for two or three passes, and these batches are then combined to uniformly distribute the same and form a uniform mass.

During the later stages of the milling and refining processes, the additions of crude rubber may be made, as well as vulcanizing ingredients, dyes or pigments. Fillers, accelerators or waxes or stearic acid, where such materials are desirable, may also be added at this stage.

In the production of an artificial leather, the quantity of raw rubber may be increased to obtain the requisite flexibility, and as high as 60% crude rubber may be added for this purpose.

In the production of artificial leather, the raw batch after milling and addition of the desired pigmenting material or dye is frictioned upon a cloth backing material which has first been treated with some suitable rubber cement, or upon a backing material which has been brushed to slightly raise the nap. After coating the rubber composition upon the cloth backing, it is passed to graining and calendering rolls, at which point the vulcanization may be effected. After calendering and graining the composite may be further heat cured by dry heat in a suitable drying room. If it is desired to have the rubber facing simulate the sheet of buffed leather, a dope of pyroxylin may be coated over the rubber, it being understood that this pyroxylin coating is suitably plasticized with plasticizing composition to give the requisite softness.

Although I have described the addition of the rosin oil, cymene and caustic soda solution and the other ingredients specified at successive stages to the rubber scrap carcass or ground whole tire, I may also produce a separate product which may be added as a whole to the cellulose rubber scrap of the character previously described. Such materials may be added by first forming an emulsion from the following ingredients, which are exemplified as my preferred emulsion forming ingredients:—

|  | Pounds |
|---|---|
| Rosin oil, equivalent to about 47% | 2 |
| Solvent, such as cymene or turpentine, equivalent to about 23½% | 1 |
| Caustic soda, equivalent to about 6% | ¼ |
| Water, equivalent to about 23½% | 1 |

In preparing this emulsion, the rosin oil is heated in the solvent of cymene or wood turpentine and while warm there is then added the caustic soda, dissolved in the water. Intimate mixing is accomplished until a uniform and stable emulsion is obtained.

4¼ pounds of the emulsion may be added to 60 pounds of rubber scrap. With a rubber scrap containing equal parts of rubber and fibre, a comparatively hard product will be obtained. Where the rubber scrap contains about 65 parts of rubber to 35 parts of fibre, a comparatively soft product will be obtained. In adding the emulsion, the preferred quantity is such as to add not more than .5% of solid caustic to the rubber in the scrap.

If it is desired, particularly in the production of an oil and gasoline resistant product, to incorporate more cellulose so that instead of having about equal parts of rubber and cellulose a higher cellulose content rubber is produced, the batch may be made from the following:

|  | Pounds |
|---|---|
| Rubber scrap (equal parts of rubber and cellulose) | 60 |
| Cellulose (cotton floc, linters, paper pulp) | 15 |
| Rosin oil | 2 |
| Solvent (cymene, turpentine) | 1 |
| Solid caustic soda | ¼ |
| Water | 1 |

The cellulose may be added to the ground rubber scrap and then the other ingredients added progressively before plasticizing the entire batch in the autoclave, or after mixing the rubber scrap and the cellulose, the emulsion previously described may be directly added.

Though in the examples above given, the alkali forms an essential ingredient and the inclusion of low percentages thereof beneficially affects the final product, in that it assists dispersion, acceleration of the vulcanization, imparts desirable tensile strength and elongation properties, the omission of the alkali will produce a lower tensile strength and some of the dispersing effect may be accomplished by the inclusion of the quantities of blood albumen or egg albumen previously mentioned, and these ingredients will serve to accentuate the accelerating effect due to the reduction or omission of the alkali, though the tensile strength, due to the inclusion of the alkali, will not be present; also, where the alkali is omitted, the accelerating effect of this material may be compensated by the addition of other known accelerating agents.

By the process of the embodiment described, the labor of separating the cellulosic material from the adherent rubber is avoided. The use of the rosin-oil-cymene mixture, with or without the blood albumen materially reduces the time necessary for plasticizing such rubber as may remain adherent to the cord or fabric of the tire carcass that is used. The time for plasticizing the rubber is materially reduced and in my preferred embodiment, where low quantities and dilute solutions of caustic soda are used, the necessity for washing out the alkali is avoided. Under this mode of operation, wherein extremely dilute solutions of alkali are used, isolation of the cellulosic fibrils is obtained in the rubber mass, with the minimum amount of labor and without the necessity for milling in fibrous materials, such as cotton floc.

By one of the methods above described where the undegenerated isolated fibrils of cellulose are incorporated in the rubber mass, in a manner adding stiffness and non-spreading qualities to the final rubber, which is not achieved by promiscuous milling of cotton floc to a rubber mass, as the isolated fibrils of cellulose appear to be attenuated in their arrangement in the rubber mass, whereas other processes tend to pulverize and disintegrate the cellulosic material.

Reference is made to my application Serial No. 167,373, filed October 5, 1937, which in turn is a division of my application Serial No. 578,198, filed November 30, 1931, now Patent No. 2,016,286, wherein there is claimed related subject matter, particularly dealing with an emulsion for dispersing rubber and other plastics and the dispersion of rubber and other plastics.

Having thus described my invention and illustrated its use, what I claim as new and desire to secure by Letters Patent, is—

1. In the process of recovering a rubber-cellulose composition, the steps which include plasticizing ground rubber-cellulose scrap in the presence of rosin oil, a solvent for the oil and dilute solutions of caustic soda in quantities insufficient to degenerate the cellulose, heating under pressure and then refining to isolate the scrap cellulose and distribute the same in the rubber.

2. In the process of recovering a rubber-cellulose composition, the steps which include plasticizing ground rubber-cellulose scrap in the presence of rosin oil, a solvent therefor and a solution of caustic soda in quantity constituting .3 to 1.5% of the rubber fibre scrap, heating under pressure and then refining to isolate the scrap cellulose and distribute the same in the rubber.

3. In the process of recovering a rubber-cellulose composition, the steps which include plasticizing ground rubber scrap comprising 50-65% rubber composition to 50-35% cellulose in the quantity of about 60 pounds of rubber cellulose scrap with 2 pounds of rosin oil, 1 pound cymene, a caustic soda solution constituting .3 to 1.5% solid caustic soda, based upon the rubber-cellulose scrap, heating in dry steam at pressures of from 175 to 200 pounds, at a temperature of about 360° F. for a period of about 1 to 4 hours and then refining to isolate the scrap cellulose in the form of individual fibrils into the rubber mass.

4. In the process of recovering a rubber-cellulose composition, the steps which include plasticizing ground rubber scrap comprising 50-65% rubber composition to 50-35% cellulose in the quantity of about 60 pounds of rubber cellulose scrap with 2 pounds of rosin oil, 1 pound cymene, ½ pound blood albumen, a caustic soda solution constituting .3 to 1.5% solid caustic soda, based upon the rubber-cellulose scrap, heating in dry steam at pressures of from 175 to 200 pounds, at a temperature of about 360° F. for a period of about 1 to 4 hours and then refining to isolate and disseminate the scrap cellulose in the form of individual fibrils into the rubber mass.

5. In the process of recovering a rubber-cellulose composition, the steps which include plasticizing ground rubber-cellulose scrap with a saponifiable solution of an oil in a carrier serving as a penetrant for the rubber and a quantity of alkali sufficient to partially saponify the oil and disperse the scrap cellulose in the subsequent refining steps, said alkali being insufficient to degenerate the cellulose.

6. In the process of recovering a rubber-cellulose composition, the steps which include grinding rubber-cellulose scrap, adding thereto an emulsion comprising a saponifiable oil, a solvent and rubber penetrant and a dilute solution of caustic soda in quantities insufficient to substantially degenerate the cellulose, plasticizing the rubber in the mixture so prepared under heat and pressure and then refining the mixture to isolate the scrap cellulose into individual fibrils and distribute the same in the rubber mass.

7. In the process of recovering a rubber-cellulose composition, the steps which include grinding rubber-cellulose scrap and adding thereto an emulsion comprising rosin oil, cymene and an aqueous solution of caustic soda constituting from .3 to 1.5% alkali, based upon the rubber-cellulose scrap, heating the mixture so prepared to plasticize the rubber and then refining to isolate the scrap cellulose into individual fibrils and distribute the same throughout the rubber composition.

8. In the process of recovering a rubber-cellulose composition, the steps which include grinding rubber-cellulose scrap and adding thereto an emulsion comprising rosin oil, cymene and an aqueous solution of caustic soda constituting about .4% alkali, based upon the rubber-cellulose scrap, heating the mixture so prepared to plasticize the rubber and then refining to isolate the scrap cellulose into individual fibrils and distribute the same throughout the rubber composition.

9. Reclaimed rubber-cellulose plasticized by a composition comprising an emulsion including a saponified mixture made from a rubber plasticizing fatty acid compounding ingredient, a solvent for said plasticizing ingredient and acting as a rubber penetrant for the plasticizing ingredient.

10. Reclaimed rubber-cellulose plasticized by a composition comprising an emulsion made from saponified rosin oil, cymene and an aqueous vehicle.

11. Reclaimed rubber-cellulose plasticized by a composition comprising an aqueous emulsion made of 2 pounds of rosin oil, a solvent for said rosin oil and acting as a rubber penetrant 1 pound, an alkaline ingredient capable of saponifying the rosin oil, the mixture resulting in a saponified condition of the rosin oil.

12. Reclaimed rubber-cellulose plasticized by a composition comprising an emulsion including a saponified mixture of an abietic acid compound, cymene, blood albumen, in an aqueous vehicle.

13. Reclaimed rubber-cellulose scrap plasticized by a composition comprising an emulsion made from about 47% of a fatty acid compound capable of plasticizing rubber, about 23½% of a rubber penetrant serving as a solvent for the compound, about 6% of an alkaline ingredient capable of saponifying said compound and about 23½% of water.

14. Reclaimed rubber-cellulose scrap plasticized by a composition comprising an emulsion made from about 47% of rosin oil, about 23½% of cymene, about 6% of caustic soda and about 23½% of water.

15. The method of recovering a rubber-cellulose mixture for use in forming a vulcanizable composition, the steps which include grinding rubber-cellulose scrap, intimately mixing therewith a saponifiable abietate in a solvent serving as a penetrant for the rubber, adding an aqueous intermixture of blood albumen, then adding a dilute caustic soda solution in quantities insufficient to substantially degenerate the cellulose, heating said mixture to plasticize the rubber and then refining the mixture so prepared to isolate the scrap cellulose and distribute the same through the rubber.

16. The process of reclaiming rubber which comprises heating fiber-containing vulcanized scrap with a small proportion of a mild alkali.

17. The process of reclaiming rubber which comprises heating fiber-containing vulcanized scrap in live steam with a small proportion of a mild alkali.

18. A reclaimed rubber derived from fiber-containing scrap and containing the fiber in an undegenerated condition together with a small proportion of a mild alkali in combined form.

MICHAEL LEVIN.